(12) United States Patent
Geum

(10) Patent No.: US 7,128,336 B2
(45) Date of Patent: Oct. 31, 2006

(54) AIR BAG DOOR OPEN STRUCTURE OF AUTOMOBILE

(75) Inventor: Woo Youn Geum, Anyang (KR)

(73) Assignee: Hyundai Motor Company, Seoul (KR)

( * ) Notice: Subject to any disclaimer, the term of this patent is extended or adjusted under 35 U.S.C. 154(b) by 197 days.

(21) Appl. No.: 10/882,543

(22) Filed: Jul. 1, 2004

(65) Prior Publication Data
US 2005/0116453 A1 Jun. 2, 2005

(30) Foreign Application Priority Data
Nov. 27, 2003 (KR) .................. 10-2003-0085019

(51) Int. Cl.
*B60R 21/16* (2006.01)
(52) U.S. Cl. .................................... 280/732
(58) Field of Classification Search ............. 280/732, 280/728.2, 728.3
See application file for complete search history.

(56) References Cited
U.S. PATENT DOCUMENTS
6,457,738 B1 * 10/2002 Labrie et al. ............ 280/728.3
6,494,481 B1 * 12/2002 Yasuda ...................... 280/732
7,007,970 B1 * 3/2006 Yasuda et al. .......... 280/728.3

FOREIGN PATENT DOCUMENTS
JP 2003-212074 7/2003

* cited by examiner

Primary Examiner—Faye M. Fleming
(74) Attorney, Agent, or Firm—Morgan Lewis & Bockius LLP

(57) ABSTRACT

An air bag open structure of an automobile includes an air bag door defined by a tear seam formed in an instrument panel. A chute is formed for mounting an air bag attached inside of the instrument panel and a hinge with one end secured between the instrument panel and chute and the other end inserted between the air bag door and door reinforcement plate, thus enabling sliding so that an air bag door package may be optimized.

1 Claim, 3 Drawing Sheets

AIR BAG DOOR OPEN STRUCTURE OF AUTOMOBILE

CROSS REFERENCE TO RELATED APPLICATIONS

This application claims priority of Korean Application No. 10-2003-0085019, filed Nov. 27, 2003, the disclosure of which is incorporated herein by reference.

TECHNICAL FIELD OF THE INVENTION

The present invention relates to an air bag door open structure of an automobile. More specifically, when the air bag door opens upon deployment of the passenger air bag, the door opens in a sliding mode with a slideable hinge.

BACKGROUND OF THE INVENTION

Generally, a passenger air bag refers to an air bag used for the safety of a passenger riding in a seat next to a driver, i.e., front passenger seat. The passenger air bag is an auxiliary safety system that prevents a passenger from directly contacting an instrument panel, windshield, etc. in the knees, head, chest, etc. when a vehicle collides.

Such a passenger air bag is allowed to deploy through an air bag door furnished in an instrument panel. A tear seam is often formed inside an instrument panel cover by a laser process so that the portion surrounded by the tear seam may function as an air bag door while not being recognized from the outside of the instrument panel, thereby improving interior aesthetics of the front passenger compartment.

However, the air bag is directly related to safety of the passenger, so smooth opening action of the air bag door must be secured upon deployment of the air bag. Therefore, its design requires that a passenger not be injured by the air bag door during deployment of the air bag.

SUMMARY OF THE INVENTION

According to a preferred embodiment, the air bag door installed in a front passenger seat compartment is allowed to open in a sliding mode via a sliding hinge. Thus, a secure and smooth opening action of the air bag door upon deployment of the air bag keeps a passenger from being injured with the light-weight hinge and door. Furthermore, by eliminating the need for formation of space for a hinge, the air bag door package is optimized.

The air bag door open structure of is configured to include an air bag door that includes a surrounding tear seam formed in an instrument panel and a chute for mounting an air bag attached inside of an instrument panel. A hinge with one end secured between the instrument panel and chute and the other end inserted between the air bag door and door reinforcement plate to enable sliding so that an air bag door package may be optimized. Furthermore, a flange is positioned in the door reinforcement plate that limits the sliding range of the hinge.

BRIEF DESCRIPTION OF THE DRAWINGS

For better understanding of the nature and objects of the invention, reference should be made to the following detailed description, taken in conjunction with the accompanying drawings, in which.

DETAILED DESCRIPTION OF PREFERRED EMBODIMENTS

Figure 1:
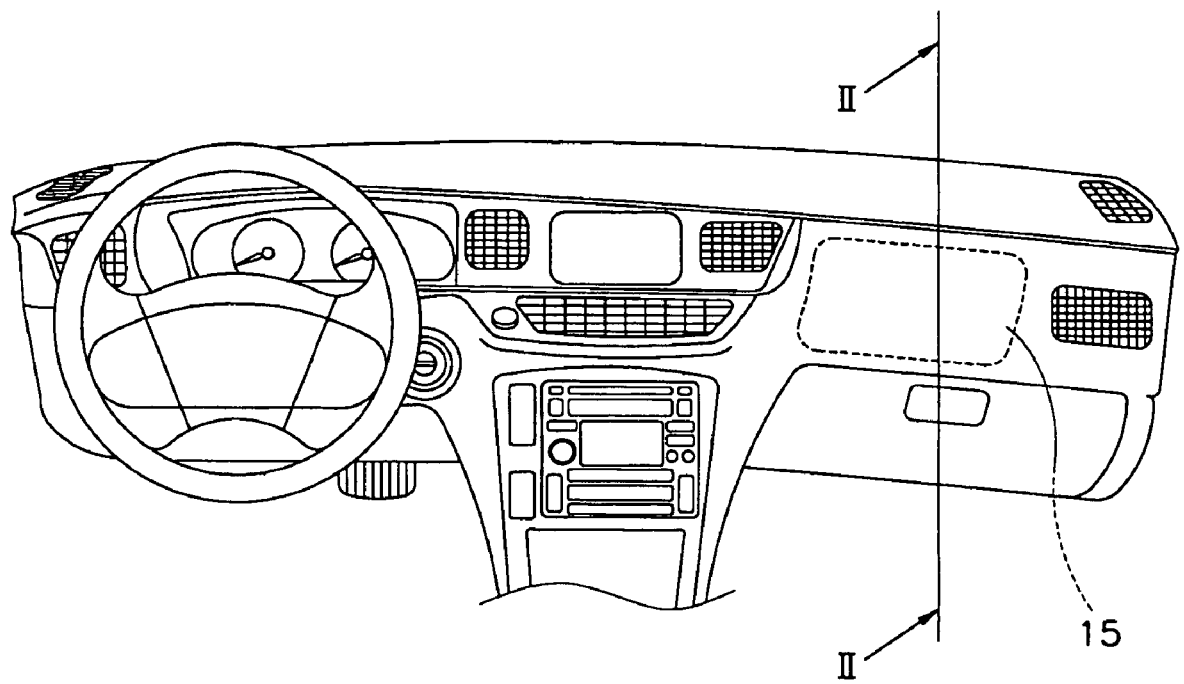
FIG. 1 illustrates a location of a passenger side air bag door of an automobile according to an embodiment of the present invention.
Figure 2:
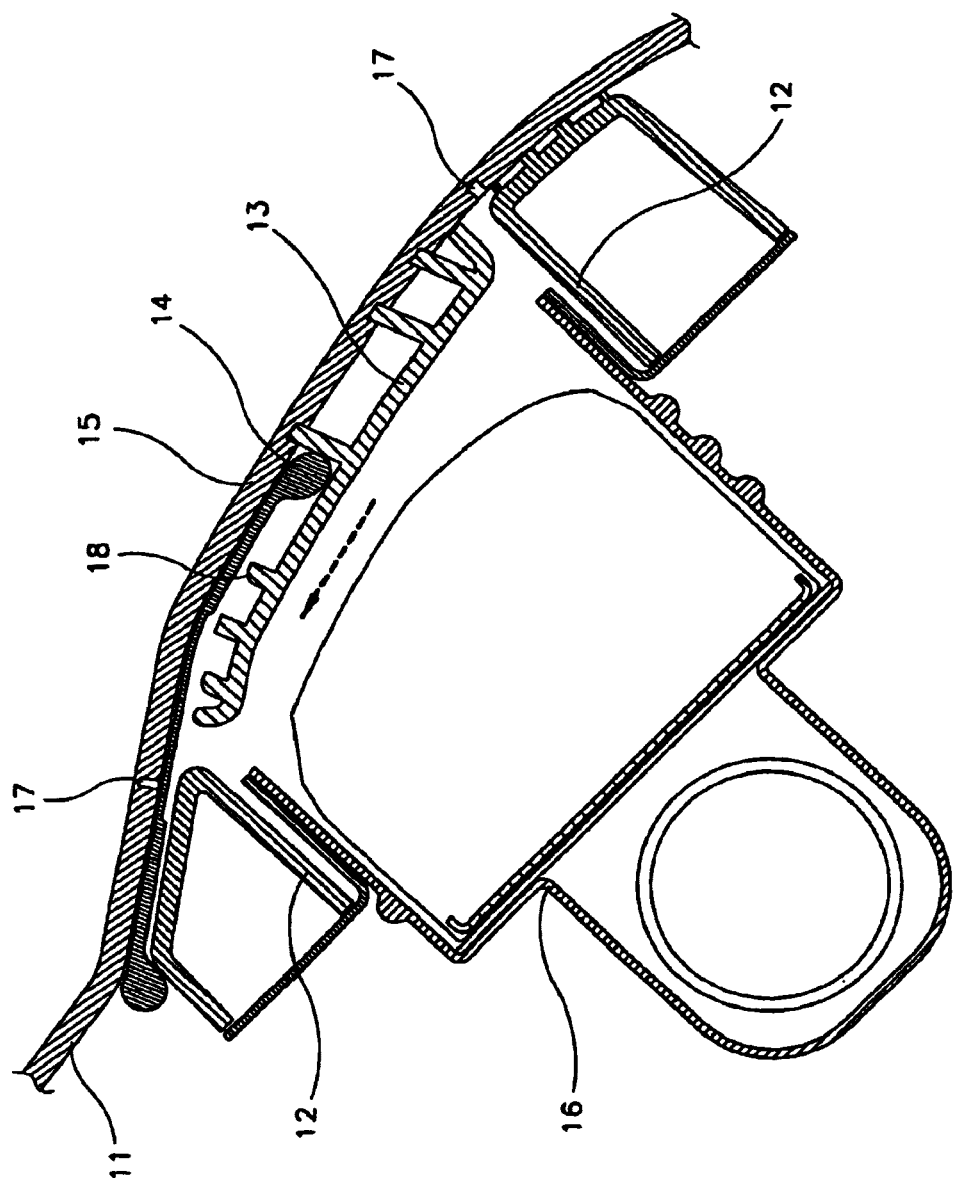
FIG. 2 is a cross-section taken along the line II—II in FIG. 1.
Figure 3:
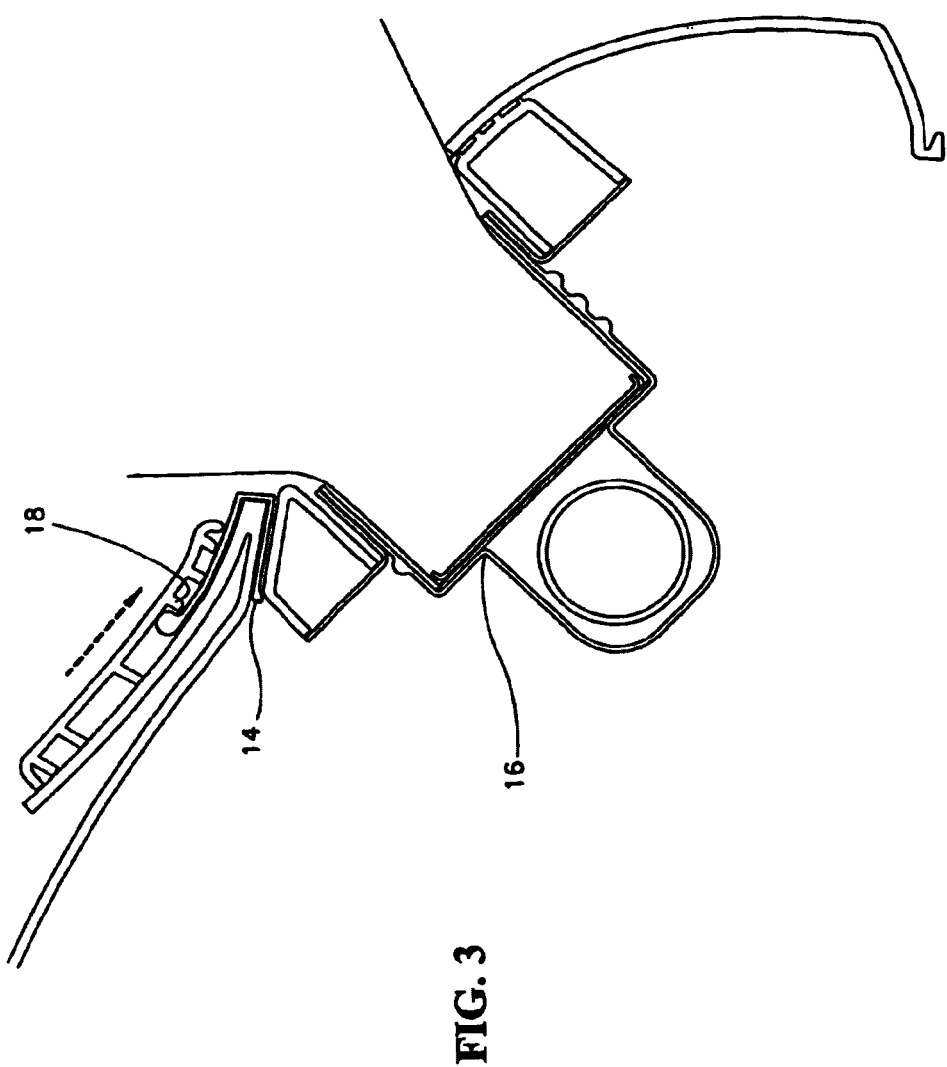
FIG. 3 shows a cross-sectional view of a deployed air bag taken along line II—II in FIG. 1.

According to FIGS. 1–3, an air bag door 15 is surrounded by a tear seam 17 formed on an instrument panel 11 of an automobile. An air bag mount chute 12 is subject to vibrating fusion attachment inside the instrument panel 11 and a door reinforcement plate 13 is attached by vibrating fusion attachment inside the door 15.

An instrument panel 11 and a chute 12 are attached, preferably by ultrasonic fusion, with one end of a hinge 14 being inserted between the instrument panel 11 and the chute 12 so that hinge 14 is secured between the instrument panel 111 and the chute 12. Airbag door 15 and a door reinforcement plate 13 are attached, with the other end of the hinge 14 being placed loosely between air bag door 15 and door reinforcement plate 13 to allow sliding.

In addition, a flange 18 is formed on the door reinforcement plate 13 to limit the sliding range of the hinge part 14. Therefore, the air bag door 15 is opened and the air bag is deployed, sliding of a hinge 14 is carried out in the direction of the arrow and the sliding range of the hinge 14 is limited by the flange 18.

While this invention has been described centering on preferred embodiments, the technical concept of this invention must not be limited to this for its interpretation, but the technical scope of this invention is defined by the appended claims.

What is claimed is:

1. An air bag door, comprising:
   an instrument panel defining a tear seam on an inside of said instrument panel, wherein said tear seam marks an air bag door;
   a door reinforcement plate coupled with an inner side of said instrument panel, wherein said door reinforcement plate includes at least one flange and wherein said door reinforcement plate is spaced away from the inner side of said instrument panel by said flange; and
   a hinge having increased thickness side portions, wherein a first side of said hinge is coupled tightly between the inner side of said instrument panel and a chute and a second side of said hinge is coupled loosely between the inner side of said instrument panel in the region of the air bag door and the door reinforcement plate such that said second side of said hinge can slide with respect to said door reinforcement plate until the increased thickness second end abuts the flange.

* * * * *